(12) United States Patent
Ignatchenko et al.

(10) Patent No.: US 9,654,297 B2
(45) Date of Patent: *May 16, 2017

(54) SYSTEMS, METHODS AND APPARATUSES FOR SECURE TIME MANAGEMENT

(71) Applicant: OLogN Technologies AG, Triesen (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,786

(22) Filed: May 6, 2016

(65) Prior Publication Data
US 2016/0254919 A1 Sep. 1, 2016

Related U.S. Application Data

(63) Continuation of application No. 13/920,299, filed on Jun. 18, 2013, now Pat. No. 9,338,010.

(Continued)

(51) Int. Cl.
*H04L 9/32* (2006.01)
*G06F 1/12* (2006.01)
(Continued)

(52) U.S. Cl.
CPC .............. *H04L 9/3268* (2013.01); *G06F 1/12* (2013.01); *G06F 12/1408* (2013.01);
(Continued)

(58) Field of Classification Search
CPC ....... H04L 9/32; H04L 9/3294; H04L 9/3297; H04L 9/3247; H04L 9/3263; G06F 1/04;
(Continued)

(56) References Cited

U.S. PATENT DOCUMENTS 5,001,752 A 3/1991 Fischer
5,327,468 A 7/1994 Edblad
(Continued)

FOREIGN PATENT DOCUMENTS

EP 1273997 A2 1/2003
EP 1 841 124 A1 10/2007
JP 2628619 B2 7/1997

OTHER PUBLICATIONS

Haberman et al, "Network time Protocol Version 4: Autokey Specification; rfc5906.txt," Internet Engineering Task Force, IETF, Jun. 21, 2010.
(Continued)

*Primary Examiner* — Jayesh Jhaveri
(74) *Attorney, Agent, or Firm* — Arnold & Porter Kaye Scholer

(57) ABSTRACT

The systems, methods and apparatuses described herein provide a computing environment that includes secure time management. An apparatus according to the present disclosure may comprise a non-volatile storage to store a synchronization time and a processor. The processor may be configured to generate a request for a current time, transmit the request to a trusted timekeeper, receive a digitally signed response containing a current, real-world time from the trusted timekeeper, verify the digital signature of the response, verify that the response is received within a predefined time, compare a nonce in the request to a nonce in the response, determine that the current, real-world time received from the trusted timekeeper is within a range of a current time calculated at the apparatus and update the synchronization time with the current, real-world time in the response.

23 Claims, 14 Drawing Sheets

Related U.S. Application Data

(60) Provisional application No. 61/661,248, filed on Jun. 18, 2012.

(51) Int. Cl.

| | | |
|---|---|---|
| *G06F 21/72* | (2013.01) | |
| *G06F 12/14* | (2006.01) | |
| *G06F 1/04* | (2006.01) | |
| *G06F 1/10* | (2006.01) | |
| *G06F 1/14* | (2006.01) | |

(52) U.S. Cl.
CPC .......... *G06F 21/725* (2013.01); *H04L 9/3247* (2013.01); *H04L 9/3263* (2013.01); *H04L 9/3297* (2013.01); *G06F 1/04* (2013.01); *G06F 1/10* (2013.01); *G06F 1/14* (2013.01); *G06F 2212/1052* (2013.01); *H04L 9/32* (2013.01); *H04L 9/3294* (2013.01)

(58) Field of Classification Search
CPC ..... G06F 1/10; G06F 1/14; G06F 1/12; G06F 21/725
See application file for complete search history.

(56) References Cited

U.S. PATENT DOCUMENTS

| | | | |
|---|---|---|---|
| 5,500,897 A | 3/1996 | Hartman, Jr. | |
| 6,728,880 B1* | 4/2004 | Sites | H04L 9/3297 |
| | | | 713/178 |
| 7,124,299 B2 | 10/2006 | Dick et al. | |
| 2002/0104004 A1 | 8/2002 | Couillard | |
| 2005/0055469 A1* | 3/2005 | Scheele | H04J 3/0664 |
| | | | 713/375 |
| 2009/0006854 A1 | 1/2009 | Alkove et al. | |
| 2009/0083372 A1* | 3/2009 | Teppler | H04L 9/3226 |
| | | | 709/203 |
| 2009/0300363 A1* | 12/2009 | Hamalainen | G06F 21/725 |
| | | | 713/178 |
| 2010/0011214 A1* | 1/2010 | Cha | G06F 21/725 |
| | | | 713/175 |
| 2013/0042135 A1* | 2/2013 | Lopez-Aguado | G06F 1/12 |
| | | | 713/400 |
| 2013/0326224 A1 | 12/2013 | Yavuz | |
| 2014/0370879 A1* | 12/2014 | Redding | H04W 4/001 |
| | | | 455/419 |

OTHER PUBLICATIONS

Hwang et al, "Embedded System Design for Network Time Synchronization," In: "Field Programmable Logic and Application," Jan. 1, 2004.

International Search Report for International Application No. PCT/IB2013/001275, mailed Nov. 21, 2013.

Perrig et al, "Efficient and Secure Source Authentication for Multicast," Feb. 28, 2001.

"Robust synchronization of software clocks across the internet," Veitch et al., *Proceedings of the 4th ACM SIGGCOMM* (2004).

Sommer et al, "Gradient clock synchronization in wireless sensor networks," International Conference on Information Processing in Sensor Networks, 2009, Apr. 13, 2009.

Windl et al, "How does it work?", Josef Stefan Institute, Nov. 21, 2006.

Written Opinion for International Application No. PCT/IB2013/001275, mailed Nov. 21, 2013.

\* cited by examiner

| | |
|---|---|
| INITIALIZATION_TIME | 211 |
| STANDARD_COUNTER_FREQUENCY | 212 |
| LOW-ENERGY_COUNTER_FREQUENCY | 213 |
| STANDARD_COUNTER_MAXIMUM_DRIFT | 214 |
| LOW-ENERGY_COUNTER_MAXIMUM_DRIFT | 215 |

210

| | |
|---|---|
| ENERGY_MODE | 221 |
| TIME_ELAPSED_UNTIL_ENERGY_MODE_SWITCH | 222 |
| ENERGY_MODE_DRIFT | 223 |
| COUNTER_START_VALUE_AT_ENERGY_MODE_SWITCH | 224 |

220

| | |
|---|---|
| TIMEKEEPER_ID | 231 |
| SYNCHRONIZATION_TIME | 232 |
| TIME_ELAPSED_UNTIL_SYNCHRONIZATION | 233 |
| SYNCHRONIZATION_DRIFT | 234 |
| RESPONSE_TIME | 235 |

SYSTEMS, METHODS AND APPARATUSES FOR SECURE TIME MANAGEMENT

RELATED APPLICATIONS

This application is a continuation of U.S. application Ser. No. 13/920,299, filed Jun. 18, 2013, which claims priority to U.S. Provisional Application No. 61/661,248, filed Jun. 18, 2012, entitled "Systems, Methods and Apparatuses for Secure Time Management," the content of which are incorporated herein by reference in their entireties.

FIELD OF THE DISCLOSURE

The systems, methods and apparatuses described herein relate to improved mechanisms for data security.

BACKGROUND

The use of time values in software and hardware applications is common. For example, in some applications it may be desirable to securely calculate the "current time," or the length of time that has elapsed since a specific event in the past. It may also be desirable to factor in any possible error in those calculations, as in some applications, a high degree of precision may be required. In other cases, high precision may not be required, but it still may be valuable to know that a time or duration is guaranteed to be within certain predefined limits (even if the precision is on the order of minutes, hours, or days). For example, relatively low-precision (on the order of hours or even days) but secure timers are often necessary in the context of validating security certificates (such as, for example, PKI certificates). What is needed are systems, apparatuses and methods for synchronizing a clock with one or more trusted time sources and for making reliable and secure time and duration calculations within known margins of error.

BRIEF DESCRIPTION OF THE DRAWINGS

FIG. 2 is an exemplary data structure according to the present disclosure.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

Figure 1:
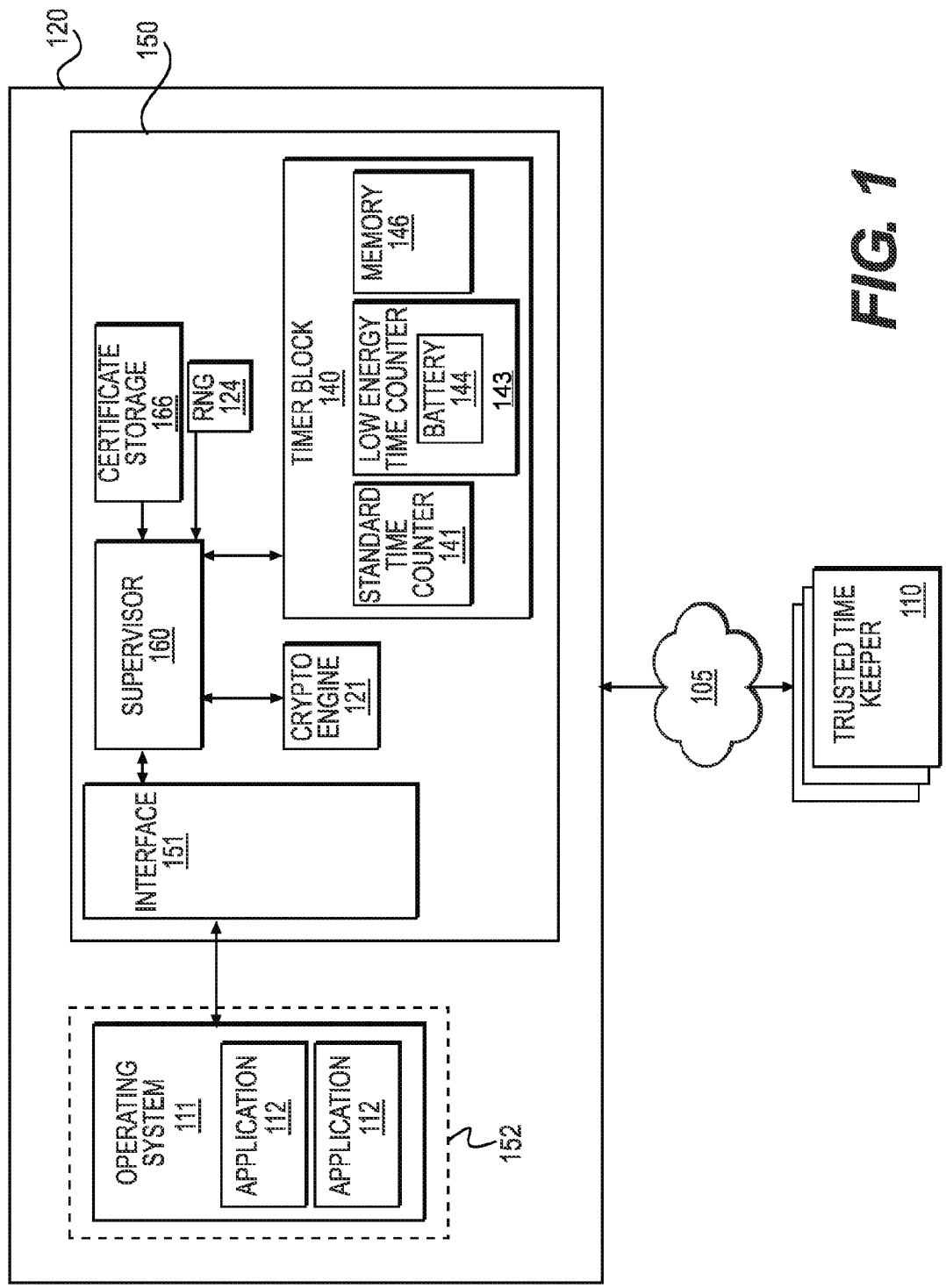
FIG. 1 is a block diagram of an exemplary system according to the present disclosure.

FIG. 1 shows an exemplary computing device 120 according to the present disclosure. A suitable computing device 120 may be any form of electronic device, such as laptop, smart phone, tablet, smart television set, etc. As described in more detail herein, a computing device 120 may first comprise a secure zone 150 that may execute certain applications or functions which may request use of an accurate time, or an accurate time interval, in the performance of certain activities. In order to support these time-related activities, the secure zone 150 may be configured, as described herein, to receive a current, real-world time from one or more external trusted timekeepers 110 via a communications channel 105 coupled to the device 120. In certain embodiments, each message may be digitally signed, such that the originating timekeeper 110 may be authenticated; in these embodiments, the secure zone 150 may verify the digital signature to ensure that the message came from a legitimate, trusted timekeeper 110. Then, the secure zone 150 may process the received timing information, using secure, internal hardware and/or software components, to provide accurate timing information to the requesting application.

In certain embodiments, in addition to the secure zone 150, the computing device 120 may also have a non-secure zone 152, which may contain an operating system 111 and one or more applications 112 running in it; in other embodiments, the non-secure zone 152 may run applications (or pieces of code) without an operating system (e.g., as described with respect to U.S. Provisional Patent Application No. 61/623,861, entitled "Secure Zone for Digital Communications," and filed on Apr. 13, 2012, the entirety of which is incorporated herein by reference). The secure zone 150 may comprise an interface 151 to communicate with the non-secure zone 152.

As shown on FIG. 1, to provide time-related functionality, the secure zone 150 may first comprise a timer block 140, capable of (i) processing messages received from one or more trusted timekeepers 110 (e.g., via a supervisor 160), and (ii) keeping track of the amount of time elapsed since the device 120 was initialized or since it was synchronized by a trusted timekeeper 110.

The timer block 140 may first comprise one or more counters which may be used to determine the time elapsed between the occurrence of two events. By way of example only, a suitable counter may take the form of an oscillator (including, but not limiting to a multivibrator) having a known frequency (in which the frequency may be optionally stabilized by using, for example, a quartz crystal resonator) and a digital counter, or any other type of apparatus capable of incrementing a count at a known frequency.

To calculate the time elapsed between two events (e.g., the time the timer block 140 was initialized/manufactured and the time it was last synchronized with a trusted timekeeper), the present state of the counter may be recorded (e.g., in a memory, shown as 146 within the timer block 140) at the first event and again at the second event. Then, in conjunction with the known frequency of the counter, the total number of counter increments occurring between the two events can be used to derive the elapsed time in seconds (or whatever other appropriate time measurement). By way of example only, a counter operating at 60 ticks/minute could have value 60 at the time of a first event and 180 at the time of a second event. The difference between the first and second events, in ticks, is 120. Thus, at 60/ticks per minute, it can be calculated that 2 minutes elapsed between the two events.

It will be understood that counters generally may be subject to drift. This drift can work both ways, such that, counter increments may take more or less actual time than the known frequency of the counter. This may occur for various reasons, including the environment in which the timer block operates (temperature may, for example, affect frequency), and wear and tear on timer block components (such as, for example, capacitor aging). This can obviously reduce the precision of timing devices, and as the time intervals to be calculated increase in length, any errors introduced by drift are likely to increase in magnitude. While the actual drift of a particular counter accumulated over time periods of the same duration may vary (for example, because of temperature), it is generally possible to specify the maximum possible drift for a given counter (or for a particular type of counters). This maximum drift parameter may be expressed, for example, as a ratio, e.g., 0.01 seconds of drift/minute, and may be stored in non-volatile memory 146 within the timer block 140. One having ordinary skill in the art will understand that, for different types of timers, the maximum drift may vary, for example, from less than 0.001 seconds of drift per minute for quartz-based timers to up to a few seconds per minute for non-quartz-based timers.

In certain embodiments, a counter may be able to operate at multiple frequencies. These frequencies may be used to operate the device in different energy modes. For example, a counter in a low energy mode might operate at a lower frequency, while a counter operating at a higher frequency might require more energy. In other embodiments, the timer block 140 might be able to operate in different energy modes by using multiple counters. In such an exemplary embodiment, as shown on FIG. 1, there may be a first, standard counter 141 and a second, low-energy counter 143.

Because of power consumption constraints on the low-energy counter 143, the implementation and precision of standard (141) and low-energy (143) counters may be different. Each of the standard counter 141 and the low-energy counter 143 may have their own operating frequencies and maximum drifts, and may be optimized for different operational requirements. An exemplary standard counter 141 may be implemented using a quartz-based oscillator, with a frequency of 32,768 Hz and with precision on the order of 0.001%. A low-energy counter 143 may be implemented using CMOS technology and operating at a very low frequency. (A significant portion of the energy consumption of a CMOS-based circuit is directly proportional to its operating frequency—so as the operating frequency is lowered, energy consumption is similarly reduced.) An exemplary low-energy counter 143 may have a frequency as low as 3 Hz; because it may be impractical to use quartz resonators at such low frequencies, the precision of the timer (or more precisely, the guaranteed maximum possible drift) may be on the order of 1%. Thus, it will be understood that in many cases there may be a tradeoff between minimizing energy consumption and maximizing precision of the device.

It may be desirable to have at least one timer counter capable of operating in the absence of an external power source. For example, in the exemplary embodiment shown on FIG. 1, the low-energy timer counter 143 may be capable of operating when external power sources are turned off. For that purpose, in one embodiment, the low-energy timer counter 143 may have a battery (or other form of power supply, such as a super-capacitor) 144, which may be used to continue to power the counter 143 even when the computing device 120 has been turned "off." In another embodiment, instead of, or in addition to, the battery 144, the low-energy timer counter 143 may use a battery or other power source (not shown) of the computing device 120.

FIG. 2 shows an exemplary structure of a timer data structure 200 which might be used by the timer block 140 to store and manipulate timer data used in the performance of its operations. In certain embodiments, certain elements of this timer data structure 200 may be read-only after the device is manufactured. This may be achieved, for example, by either placing such data into read-only, non-volatile memory, or by enforcing correspondent policies inside the secure zone 150 by, for example, preventing the over-writing of such data. This timer data may be stored, for example, within memory 146.

As shown on FIG. 2, the timer data structure 200 may contain a timer characteristics data block 210. This timer characteristics data block 210 may contain, for example, the real-world time at which the timer block 140 is first initialized, an initialization_time 211. In addition, the timer characteristics data block 210 may include certain properties of either the standard timer counter 141, the low-energy timer counter 143, or both. For example, the block 210 may store the respective operating frequencies of the two timers (the frequency of the standard counter 141 shown as standard_counter_frequency 212, and the frequency of the low-energy timer counter 143 shown as low-energy_counter_frequency 213).

The timer characteristics data block 210 may further store the maximum drift rates (e.g., 0.1 seconds of drift per hour) of the standard timer counter 141 and the low-energy timer counter 143, shown as standard_counter_maximum_drift 214, and low-energy_counter_maximum_drift 215, respectively. In certain embodiments, all of the data contained in this block 210 may be initialized at the time the secure zone 150 is manufactured (e.g., in accordance with the exemplary method described with respect to FIG. 3, below) and may not be further modified. As noted above, this policy may be enforced by storing this data into read-only, non-volatile memory, may be enforced through coded policies, or any other appropriate mechanism for preventing modification of these data fields.

In embodiments containing two or more counters, the data structure 200 may contain a switching event data block 220, which may be used to store any information about the last energy mode switching event, i.e., the last instance at which the timer block 140 switched from operating in one energy mode (e.g., standard mode) to another mode (e.g., low-energy mode). This information can be used to make timing determinations at the time of the next energy mode switching event.

For example, information may be stored in the switching event data block 220 when the timer block 140 switches from using a standard counter 141 to a low-energy counter 143. Then, when the timer block 140 switches again, from the low-energy counter 143 back to the standard counter 141, information stored in the switching event data block 220 about the last energy mode transition (i.e., from standard counter 141 to low-energy counter 143) may be used, for example, to calculate the amount of time elapsed while the timer block 140 operated in low-energy mode.

In certain embodiments, four values may be associated with a switching event and stored in the switching event data block 220. First, energy_mode 221 may store a value representative of the new energy mode type in effect following the transition. Second, time_elapsed_until_energy_mode_switch 222 may store the total elapsed time since the device 120 was first initialized and the most recent energy transition, calculated based on counters 141 and 143 and expressed, for instance, in seconds. (It will be noted that although the current disclosure consistently describes elapsed time with reference to device 120 initialization, the invention is not so limited and may calculate elapsed times with reference to other data points, such as a timer block 140 initialization time, secure zone 150 initialization time, etc.) Third, energy_mode_drift 223 may store the maximum total amount of drift accumulated between the time the device 120 was first initialized and the time of the most recent energy mode switch. Fourth, counter_start_value_at_energy_mode_switch 224 may store the starting value of the counter which is operational immediately following the most recent energy mode switch. For example, if the transition is from standard mode to low-energy mode, counter_start_value_at_energy_mode_switch 224 may store the value of the low-energy counter 143 at the time it is activated. In certain embodiments, it may be desirable to reset the associated counter to zero when a switch from one energy mode to another occurs. For example, if the timer block 140 switches into a low-energy mode, at the point the switch is made it may be desirable to reset the value of the low-energy counter 143 to zero.

It will be understood that the foregoing description of data block 220 is merely exemplary and that there are other ways to express time-and drift-related values other than in the manner just described. For example, in some embodiments, instead of time_elapsed_until_energy_mode_switch 222 and energy_mode_drift 223, it may be desirable to use two other values, (i) the minimum amount of time elapsed until the most recent energy mode switch, and (ii) the maximum amount of time elapsed until the most recent energy mode switch (not shown). In such an embodiment, the difference between these two values will be twice the energy_mode_drift 223 and the time_elapsed_until_energy_mode_switch 222 will be the midway point between these two values. It will be understood that the alternate description above (provided with respect to data block 220) allows for the calculation of these minimum/maximum values from the energy_mode_drift 223 and time_elapsed_until_energy_mode_switch 222 and vice versa, and therefore these minimum/maximum values form merely an alternative representation. This alternative representation via minimum/maximum values may seem more logical from the user's perspective, as this representation allows a user to easily determine that the current time is at least x (the minimum time) and cannot exceed y (the maximum time). Further, this representation may simplify certain calculations with respect to time errors, as are discussed in greater detail below.

It is noted that, if only a single counter is used, and its characteristics (like frequency and maximum drift) do not depend on the energy mode, or, if there is only one energy mode, this switching event data block 220 may not be necessary.

The data structure 200 may comprise a third, synchronization data block 230, which may store information about the last synchronization event—that is, the most recent event during which a real-world time was securely received from a trusted timekeeper 110. Five values may be associated with such an event, each of which is discussed in greater detail below. First, timekeeper_ID 231 may store a globally-unique identifier of the trusted timekeeper 110 from which a new time was received, which may include a trusted timekeeper certificate or a reference to the timekeeper's certificate (such as a serial number of the timekeeper's certificate). Second, the synchronization data block 230 may store as synchronization_time 232 the real-world time received from the trusted timekeeper 110 (identified by timekeeper_ID 231) during the most recent synchronization event. Third, the block 230 may store as time_elapsed_until_synchronization 233 the amount of time elapsed (according to counters 141 and 143) from the time the device 120 was first initialized until the most recent synchronization. Fourth, the block 230 may store as synchronization_drift 234 the maximum amount of drift accumulated from time of the device 120 was first initialized until the most recent synchronization. Fifth, the block 230 may store as response_time 235 the amount of time it took to receive a response from a timekeeper 110 after a request for secure time data.

It will be understood that the order of data blocks described herein is not essential but merely exemplary, and that any requisite data may be arranged in accordance with any suitable method. It will further be understood that although the data structure 200 is shown as a single structure with three component blocks, the data may in fact be organized into more than one data structure or a different number of component blocks. In other words, the data may be organized into any number of structures or blocks as appropriate for a specific implementation. It should also be understood that additional data also may be associated with the timer block 140, the data structure 200, or any of their respective components.

Figure 3:
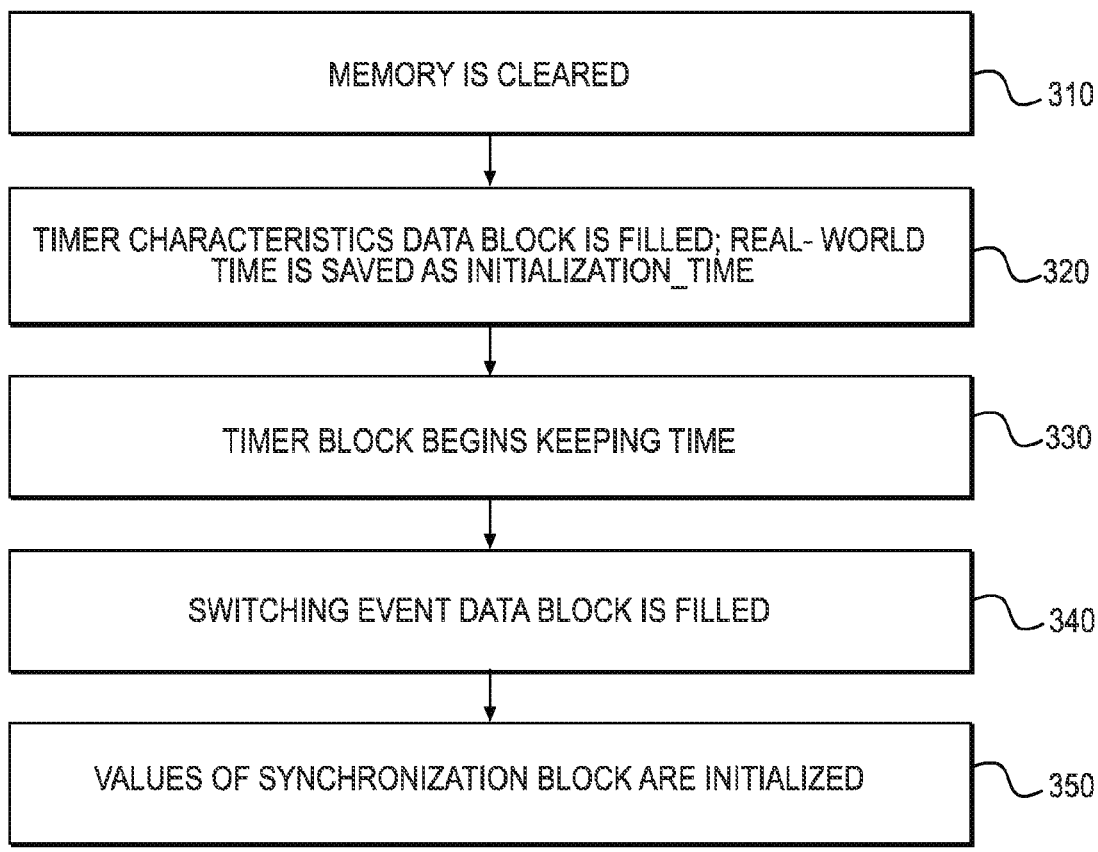
FIGS. 3 and 4 show flow diagrams of exemplary methods of initializing and operating a timer block according to the present disclosure.

FIG. 3 is a flow chart showing an exemplary process by which a computing device 120 may be initialized for timekeeping at, for example, the time at which the device 120 is manufactured. This process involves initializing any values stored within a timer data structure 200.

As shown on FIG. 3, at step 310, any memory 146 associated with any existing timer data may be cleared. For instance, the memory 146 may be zeroed. At step 320, the timer characteristics data block 210 may be filled. For example, the frequency and maximum drift rates (shown as standard_counter_frequency 212, low-energy_counter_frequency 213, standard_counter_maximum_drift 214, and low-energy_counter_maximum_drift 215 on FIG. 2) may be set. Additionally, the current, real-world time may be saved as the initialization_time 211. This real-world time may be provided by, for example, a computer connected to the U.S. National Institute of Standards (NIST) official U.S. time clock, a GPS receiver, an atomic clock, or some other form of precise timing mechanism.

At step 330, the timer block 140 may begin keeping track of the amount of time elapsed since the computing device 120 was initialized. In embodiments having two or more counters (such as the embodiment shown on FIG. 1), it may be desirable only to start one counter; in other embodiments, both counters may need to be started. Which counter is started may depend on the overall characteristics of the computing device 120 and/or the secure zone 150, the characteristics of the counters, the preferences of the manufacturer, or any other method for selecting an energy mode. For example, in embodiments wherein precision is valued over energy efficiency, a standard energy mode—making use of a standard counter 141—may be preferable, it being understood that a standard counter 141 is likely to provide higher precision. In other embodiments, particularly in those in which there will be no external power source available for the timer block's operation, it may be preferable to start the timer block 140 in low-energy mode, making use of the low-energy counter 143. In still other embodiments, the low-energy counter 143 may run all the time, while the standard counter 141 may run only when external power is available.

At step 340, the values of the switching event data block 220 may be initialized. For example, first, energy_mode 221 may be set to a value representative of the energy_mode in which the device 120 started; second, the time_elapsed_until_energy_mode_switch 222, i.e., the time elapsed between initialization and the most recent energy mode switch (which has likely not yet occurred since the device is currently being initialized) may be set to zero; third, energy_mode_drift 223, the amount of timer drift accumulated from time of the first initialization, also may be set to zero; and fourth, counter_start_value_at_energy_mode_switch 224, the starting value of the currently operational counter, also may be set to the value of the counter at the time it was started, e.g., at step 330. In many cases, this fourth value may also be zero.

At step 350, the values of the synchronization block 230 may be initialized. The timekeeper_ID 231 may be set to zeroes, NULL, or some other appropriate indicator that the timer block 140 has not been synchronized. The synchronization_time 232, i.e., the time of the most recent synchronizing event, may be set to the initialization_time 211; the time_elapsed_until_synchronization 233 may be set to zero; and the synchronization_drift 234, the maximum drift accumulated from time of the first initialization, also may be set to zero. This initialization may simplify further calculations since the latest synchronization event data is always initialized.

Once the computing device 120 has been initialized, e.g., in accordance with the method described with respect to FIG. 3, the timer block 140 can be used to calculate the current time or the time elapsed between two events.

Figure 8:
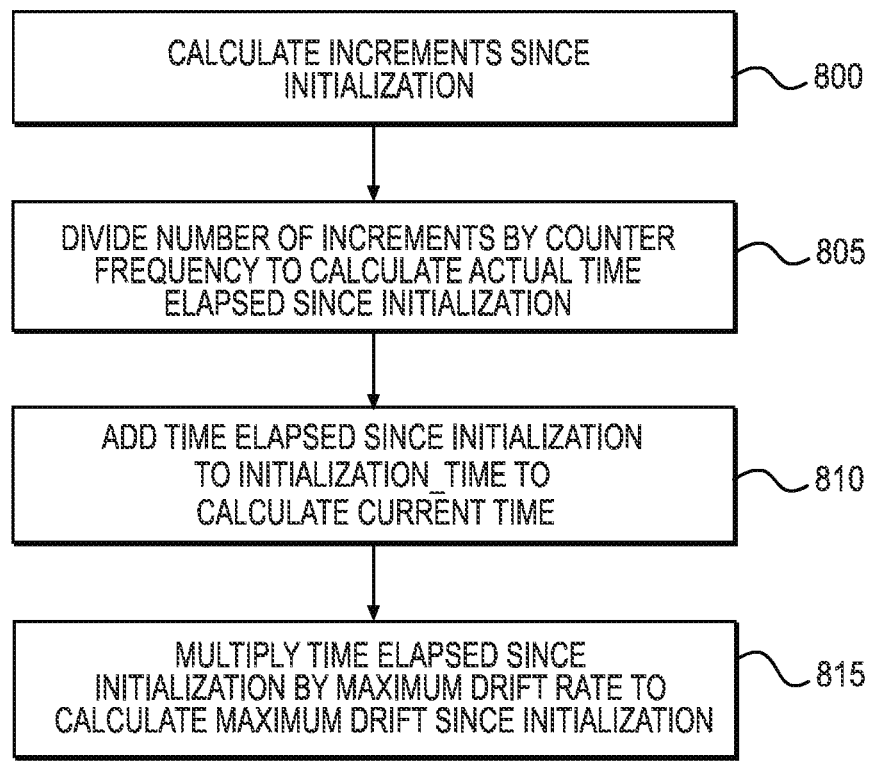
FIG. 8 is a flow diagram of an exemplary method for calculating the current time in an embodiment having one counter.

FIG. 8 illustrates one method by which the current time may be calculated. For the purposes of FIG. 8, it is assumed that there is only one counter, such that there is no switching event data block 220. As shown on FIG. 8, at step 800, the number of counter increments since the computing device 120 was initialized may be obtained. Assuming that the counter was set to zero at initialization, this amount may simply be the present value of the counter. At step 805, this value may be divided by the counter frequency, which provides the total amount of time elapsed since the computing device 120 was initialized. Then, at step 810, this amount may be added to the initialization_time 211 to produce the current time.

For example, a 3-Hz counter may have been initialized to have a value of zero at 12:00 am, Jan. 1, 2012. The present value of the counter may be 5400. Following the method just described, the current time may be calculated as follows: First, 5400 counter increments divided by 3 Hz gives 1800 seconds (or 30 minutes) of elapsed time. This value is then added to the initialization_time 211 of 12:00 am, to give a current time of 12:30 am.

As noted previously, the counter may be subject to drift. Thus, it will be understood that the potential error in the calculated time may be as large as the maximum drift accumulated since the device 120 initialization. Therefore, it may be desirable to also calculate the maximum amount of drift time since device 120 initialization. To do so, at step 815, the total amount of time elapsed since the device was initialized (e.g., as determined at step 805), may be multiplied by the counter's maximum drift rate. For example, if the elapsed time was calculated at step 805 as 30 minutes, and the maximum drift rate of the counter is 1%, then the maximum drift since the time of device initialization is 1800 seconds*0.01, or 18 seconds.

Figure 9:
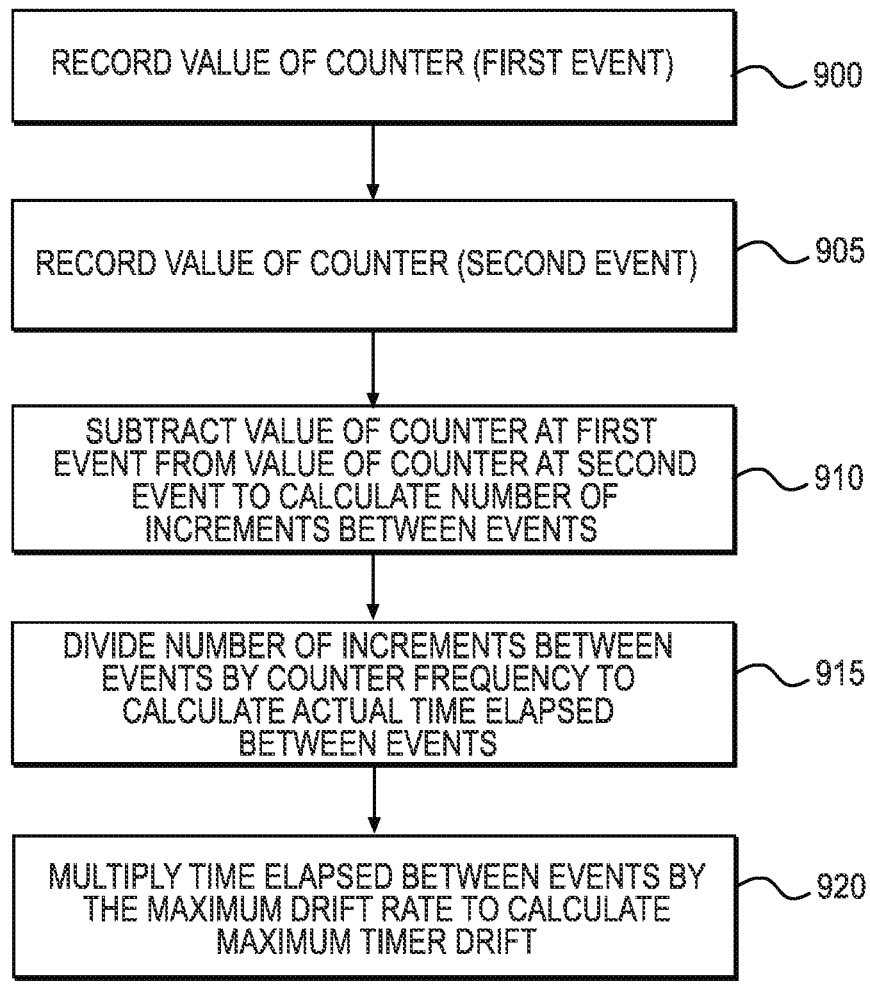
FIG. 9 is a flow diagram of an exemplary method for calculating the time elapsed between two events in an embodiment having one counter.

The foregoing methods for calculating the current time and the maximum drift since initialization also may be used to calculate time intervals (and the accuracy thereof). For example, it may be desirable to know the amount of time between two events. FIG. 9 shows one exemplary method for calculating this time interval. At step 900, the value of the counter may be recorded, contemporaneously with the occurrence of the first event. At step 905, contemporaneously with the occurrence of the second event, the value of the counter may again be recorded. At step 910, the value of counter recorded at the time of the first event may be subtracted from the value of counter recorded at the time of the second event to determine the number of count increments between two events. At step 915, this difference may be divided by the counter frequency (e.g., to convert counter increments into seconds or some other unit of time) to determine the interval between the two events.

It may be desirable to know the maximum amount of drift accumulated during the time between two events. Accordingly, this amount may be calculated at step 920. One having ordinary skill in the art will understand that there are numerous methods by which this calculation may be performed. For example, the difference between (i) the maximum drift accumulated since initialization as of the time of the second event and (ii) the maximum drift accumulated since initialization as of the time of the first event may be calculated. Alternatively, the maximum amount of drift accumulated during time between two events may be calculated by multiplying the time elapsed between the two events (as calculated at step 915) by the maximum drift rate of the timer.

Depending on the type of counter and the associated maximum drift, the accuracy of these time calculations may not be sufficient in certain types of applications. However, because a current time or interval calculation (as shown in accordance with FIGS. 8 and 9 respectively) does not depend on any subsequent resynchronization—and, therefore, does not rely on any external timekeepers, which may or may not ultimately be trustworthy—these calculations can be used to verify that current times reported by trusted timekeepers 110, during the process of resynchronization, are reasonable. Various methods for performing this verification are discussed in greater details below.

Figure 4:
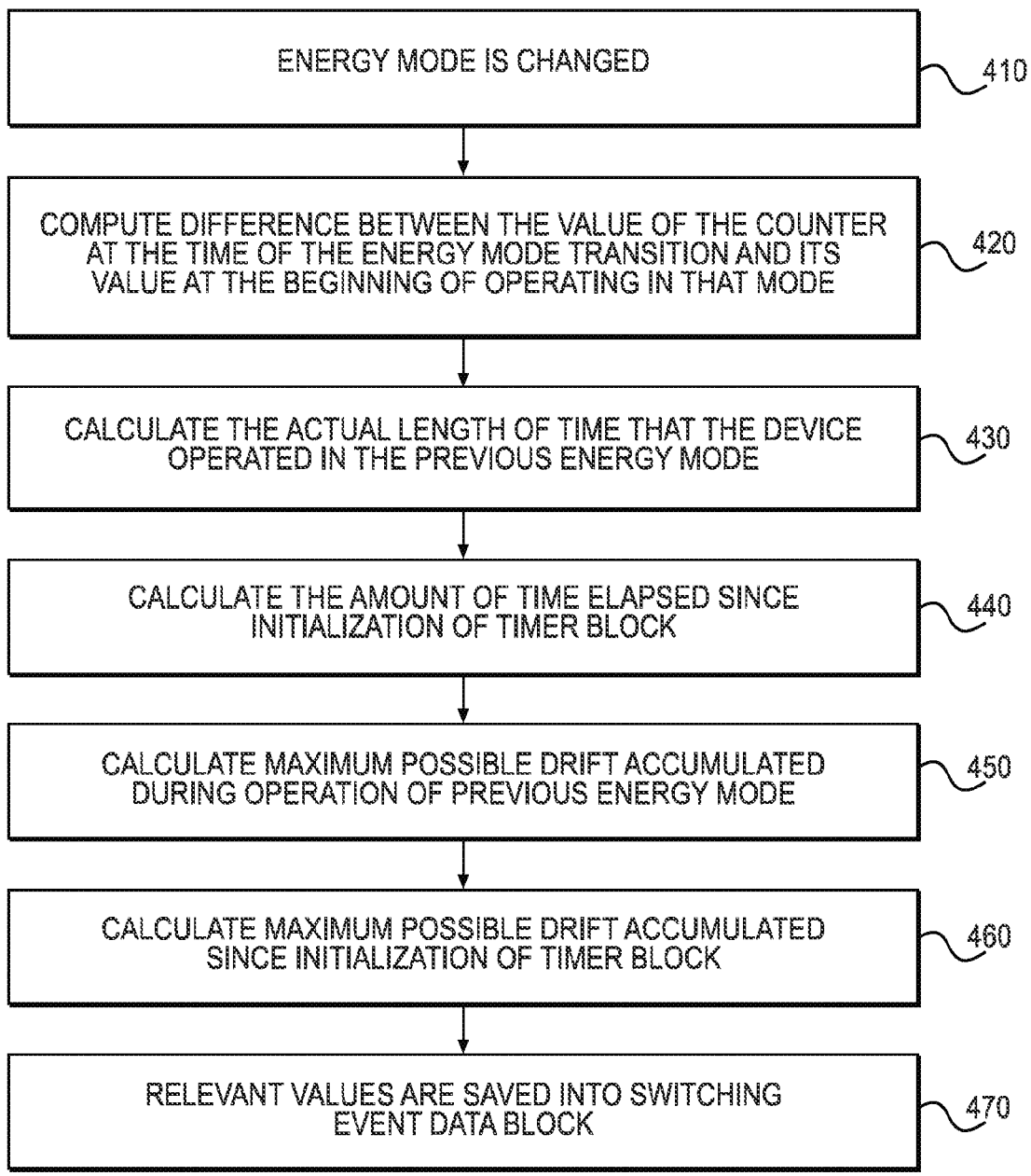

As noted above, in certain embodiments, the timer block 140 may have one or more counters enabling two or more energy modes. FIG. 4 is a flow chart showing one exemplary method by which timer data may be updated when an energy mode is changed.

As shown on FIG. 4, at step 410, the energy mode may be changed. For instance, the computing device 120 may have been unplugged from an external power source, causing the timer block 140 to start operating in a low-energy mode. This may be accomplished, for example, by using a low-energy time counter 143 configured to receive power from an internal battery 144.

Steps 420 and 430 may be used to calculate the amount of time elapsed in the previous energy mode. In the foregoing example, the computing device 120 had been operating in standard mode until it was unplugged from an external power source, causing the timer block 140 to start operating in a low-energy mode. Thus, steps 420 and 430 may be used to calculate the amount of time elapsed while the device 120 was operating in standard mode (right up until the point the device 120 transitioned into low-energy mode).

At step 420, the difference may be calculated between the value of the counter (corresponding to the old energy mode) at the time of the energy mode transition (e.g., the value at step 410), and its value at the beginning of operating in that mode (previously stored in counter_start_value_at_energy_mode_switch 224). In embodiments wherein the value of a counter at the beginning of its operation in a particular mode is set to zero, this difference is merely the then-current value of the counter at the time of step 410.

For example, in the foregoing example, at the time the device 120 is unplugged and transitions into low-energy mode, at this step 420, the difference is calculated between the value of the standard counter 141 at the time the energy mode switch was effected (at step 410), and the value of the standard counter 141 at the time it had been started (previously stored in counter_start_value_at_energy_mode_switch 224). If the value of the standard counter 141 had been reset to zero when the device 120 began operating in standard energy mode, this "difference" will simply be the value of the standard counter 141 at the time the device 120 transitions into low-energy mode (e.g., the value at step 410).

At step 430, the difference calculated at step 420 may be used to calculate the length of time that the device operated in the previous energy mode. This may be calculated, for example, by multiplying the difference calculated at step 420 (e.g., the number of counter ticks elapsed during operation in the previous energy mode) and the known frequency of the counter. For example, if the timer block 140 transitioned from operating in standard-energy mode to low-energy mode, the number of counter increments calculated at step 420 may be divided by the frequency stored as standard-energy_counter_frequency 212 in timer characteristics data block 210. Thus, for example, if the frequency in standard energy mode 212 were 2000 ticks per second, and the difference calculated at step 420 is 7,200,000 ticks, then the time of operation in the standard-energy mode was 3600 seconds, or 1 hour.

At step 440, the amount of time elapsed from the time that the timer block 140 was first initialized until the time of the last energy mode transition may be computed based on the amount of time that the timer block 140 operated in the previous energy mode (as just calculated in steps 420 and 430) and the amount of time elapsed since the device 120 was first initialized, which is stored as time_elapsed_until_energy_mode_switch 222 of the data block 220. For example, the record 222 may show a value of 1900800 seconds, indicating that three weeks and one day had passed since the time the computing device 120 was initialized up until the immediately preceding energy mode transition. Then, at step 430, it may have been determined that the timer block 140 operated in the previous energy mode for a total of 7200 seconds. As a result, the total time elapsed since the device 120 was initialized up through the last energy mode transition is 1908000 seconds (or 3 weeks, 1 day and 2 hours).

At step 450, the maximal potential drift which may have accumulated during the previous energy mode, may be computed. This maximal accumulated drift may be calculated based on the duration of time that the timer block 140 operated in the previous energy mode (e.g., as computed at step 430) and the maximum drift rate for the corresponding energy mode. For example, if the timer block 140 operated in standard-energy mode for 7200 seconds, and the standard_counter_maximum_drift 214 is 0.01 seconds of drift/minute, then (since 7200 seconds=120 minutes) the drift accumulated during that period may be as large as 1.2 seconds.

Figure 5:
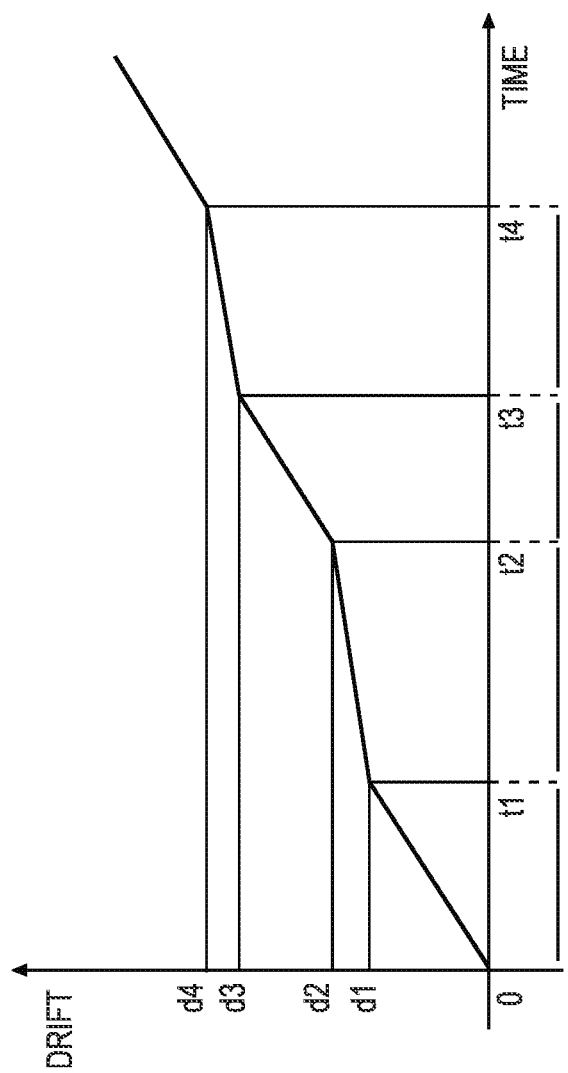
FIG. 5 is a graph showing how maximum possible timer drift may accumulate over various time periods.

At step 460, the maximal possible total drift (i.e., the maximum drift which could have accumulated from the time the device 120 was first initialized) may be computed. This amount may be calculated as the sum of the maximum possible drift accumulated from the time the secure zone 150 was first initialized up until the time of the immediately preceding energy mode switch (this value may be found within energy_mode_drift 223 of the switching event data block 220) and the maximum potential drift accumulated during the previous energy mode (e.g., the amount calculated at step 450). FIG. 5 illustrates, in graphical format, how the maximum possible drift may accumulate over 4 time intervals (which may correspond, for example, to 4 energy mode transitions).

At step 470, the new values—pertaining to the energy mode immediately prior to the most recent energy mode switch—may overwrite any values previously within the data block 220. For example, the value of the current energy mode type (generated by transitioning the timer block 140 from one mode to another) may be stored into energy_mode 221 of the existing data block 220, overwriting the old value. The present time (e.g., the time elapsed since the device 120 was initialized, as determined at step 440) and the maximum possible drift accumulated since the device 120 was first initialized (e.g., as determined at step 460) may be stored into time_elapsed_until_energy mode_switch 222 and energy_mode_drift 223 of the data block 220, respectively.

As noted, FIG. 4 showed one exemplary method by which timer data may be updated when an energy mode is changed. In some embodiments, however, it may be difficult to perform these operations when the power is turned off. In such embodiments, it may be useful to update timer data at regular intervals (for example, once per minute) while the device 120 remains powered, rather than performing these operations after the power has been turned off.

FIG. 8 illustrated an exemplary method by which the current time may be calculated in embodiments having only one counter. Similar computations may be performed to determine the current time in embodiments having two or more counters. In one exemplary embodiment, these amounts may be calculated based on the values stored at the last energy mode change, e.g., within data block 220. FIG.

10 shows one such exemplary method for calculating the current time in embodiments having two or more counters.

At step 1000, the difference may be calculated between the present value of the currently operational counter and the value of counter_start_value_at_energy_mode_switch 224.

At step 1010, this value may be divided by the appropriate counter frequency (depending on the current energy mode, this could be, for example, either standard_counter_frequency 212 or low-energy_counter_frequency 213). The result of this division may be interpreted as the amount of time passed since the last energy mode change.

At step 1020, this amount may be added to time_elapsed_until_energy_mode_switch 222 to obtain the total amount of time elapsed since the device 120 was initialized. Then, at step 1030, the initialization_time 211 may be added to the total amount of time elapsed since device initialization (e.g., the amount calculated at step 1020) to calculate the current time.

For example, assume that the present value of the low-energy counter 143 is 10800, its value at the time it began operating in the present energy mode (i.e., the value of counter_start_value_at_energy_mode_switch 224) was 5400, the low-energy_counter_frequency 213 is 3 Hz, the time_elapsed_until_energy_mode_switch 222 is 9000 seconds, and the initialization_time 211 is 12:00 am Jan. 1, 2012. In such an example, the current time would be calculated as follows:

[Step 1000] 10800−5400=5400 counter increments since the last energy mode change.
[Step 1010] 5400 increments/3 increments/sec=1800 seconds elapsed since the last energy mode change.
[Step 1020] 1800 seconds+9000 seconds=10,800 seconds or 3 hours, elapsed since the device 120 was initialized
[Step 1030] 12:00 am+3 hours=3:00 am Jan. 1, 2012

It may further be desirable to calculate the maximum amount of drift accumulated since the initialization of the device 120. This amount may be calculated by, at step 1040, multiplying the amount of time elapsed since the last energy mode change (i.e., the amount calculated at step 1010) by the appropriate counter drift rate to obtain the maximum amount of drift accumulated since the last energy mode change. At step 1050, this amount may be added to the total maximum amount of drift accumulated since device initialization up until the last energy mode change (i.e., energy_mode_drift 223) to provide the total maximum amount of drift accumulated since the device 120 was initialized.

Figure 11:
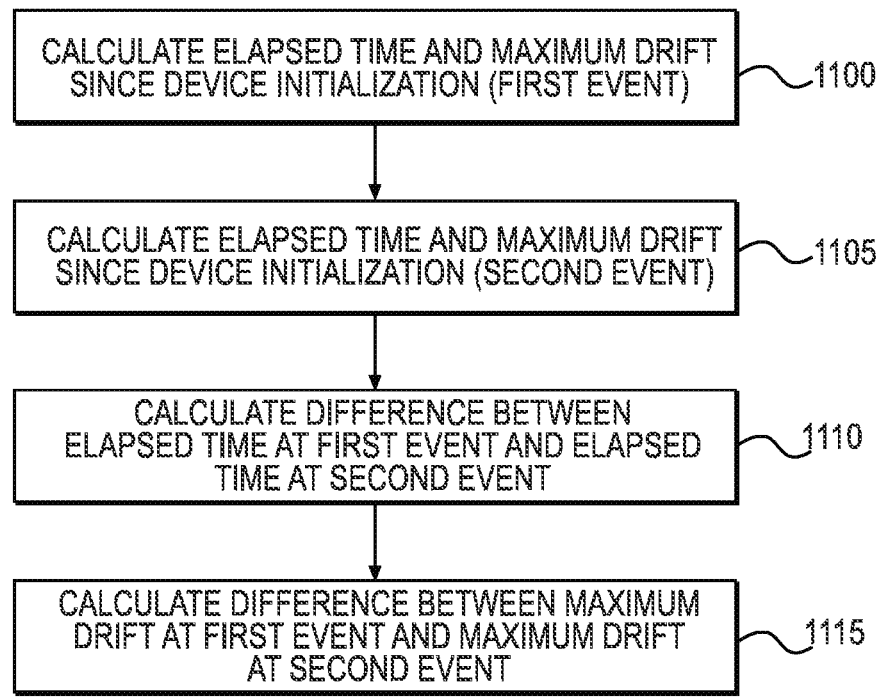
FIG. 11 is a flow diagram of an exemplary method for calculating the time elapsed between two events in an embodiment having two counters.

For instance, assume that, in the foregoing example, the counter's maximum drift rate is 0.01 and the energy_mode_drift 223 is 12 seconds. In such an example, the maximum drift since initialization may be calculated as follows:

[Step 1040] 1800 seconds*0.01=18 seconds of drift since the last energy mode change
[Step 1050] 18 seconds+12 seconds of drift prior to the last energy mode change=30 seconds of total drift since initialization FIG. 9 illustrated an exemplary method by which the amount of time and drift accumulated between two events may be calculated in embodiments having only one counter. Similar computations may be performed to determine the amount of time and drift accumulated between two events in embodiments having two or more counters. In one exemplary embodiment, these amounts may be calculated based on the values stored at the last energy mode change, e.g., within data block 220. FIG. 11 shows one such exemplary method for calculating the amount of time elapsed between two events, as well as the maximum drift accumulated during that time, in embodiments having two or more counters.

At step 1100, the elapsed time since the device 120 was initialized, and the maximum drift accumulated during that interval, may be calculated, e.g., as described with respect to FIG. 8, and recorded, contemporaneously with the occurrence of the first event.

At step 1105, contemporaneously with the occurrence of the second event, the elapsed time and maximum accumulated drift since device 120 initialization may again be recorded.

At step 1110, the elapsed time recorded at the time of the first event may be subtracted from the elapsed time recorded at the time of the second event to determine the duration between the two events.

Similarly, at step 1115, the value of the maximum accumulated drift recorded at the time of the first event may be subtracted from the value of the maximum accumulated drift recorded at the time of the second event to determine the maximum accumulated drift during the period between the two events.

For example, assume that at time of the first event the elapsed time since device 120 initialization is 10,800 seconds, and the maximum drift accumulated since the device 120 was initialized is 32 seconds (both as calculated and recorded at step 1100); and further assume that at the time of the second event the elapsed time since device 120 initialization is 16,200 seconds and the maximum drift accumulated since the device 120 was initialized is 51 seconds (both as calculated and recorded at step 1100). In such an example, the time elapsed between the two events (and the maximum drift accumulated during that interval) may be calculated as follows:

[Step 1110] 16,200−10,800=5400 seconds (or 1.5 hours) passed between the two events.
[Step 1115] 51−32=19 seconds, which is the maximum drift which could have accumulated between the two events.

With time, the amount of timer drift accumulated from the first initialization may become significant, and the timer block 140 may require synchronization with one or more external timekeepers 110. Optimally, a precise time can be obtained in a secure manner. As shown on FIG. 1, a secure zone 150 according to the present disclosure may comprise a supervisor 160 in support of secure timekeeping. This supervisor 160 may be able to: (1) receive information from one or more trusted timekeepers 110; (2) validate received timing information; (3) estimate the value of the present real-world time and any possible errors in such an estimation, and provide one or both pieces of information to entities interested in such information; and/or (4) enforce certain internal or external policies based on the present time or a period of elapsed time, such as checking a digital certificate expiration time in the process of performing certificate validation. These functions are described in greater detail herein.

In some embodiments, the supervisor 160 further may perform certain other, additional functions, such as: (5) receiving executable code which can be run on one or more processors (not shown) within the secure zone 150; (6) verifying any digital certificates associated with this code; and/or (7) if one or more predetermined requirements are fulfilled, instruct a processor (not shown) within the secure zone 150 to execute the code. For example, the supervisor 160 might be able to fulfill one or more tasks as described in U.S. Provisional Application No. 61/623,861 (previously mentioned) or U.S. Provisional Patent Application No. 61/636,201, entitled "Improved Secure Zone for Secure Purchases," and filed on Apr. 20, 2012, the entirety of which is incorporated herein by reference.

In some embodiments, the timer block 140 may be implemented as a part of the supervisor 160; in other embodiments, the timer block 140 and the supervisor 160 may be implemented as two separate units.

The supervisor 160 may be used to control access to one or more components of the secure zone 150, and may be used to enforce certain operational rules of the secure zone 150 so as to provide certain security guarantees to the end-user. The supervisor 160 may be implemented in hardware and/or software within the secure zone 150. Regardless of the implementation, however, the integrity of the supervisor 160 should be guaranteed by using, for example, tamper-resistant and/or tamper-detection techniques. In addition, if the secure zone 150 implements the option to load and execute third-party code, measures should be taken to ensure that any such third-party code is not capable of affecting or learning the state of the supervisor 160.

In certain embodiments, the secure zone 150 may further comprise one or more cryptographic engines 121, which may be used by the supervisor 160, among other things, in support of timekeeper certificate verification. These cryptographic engines 121 may be configured to implement one or more cryptographic algorithms, such as AES or RSA. The cryptographic engine 121 may receive data from the supervisor 160 for encryption or decryption, and may provide the resulting ciphertext (or plaintext, as appropriate) back to the supervisor 160. The secure zone 150 may also comprise a random number generator 124 to provide support to cryptographic processes. In other embodiments, the supervisor 160 may be configured to perform some or all of the functionality of the cryptographic engine 121, and a separate cryptographic engine 121 may not be required.

As shown on FIG. 1, the secure zone 150 further may contain one or more dedicated certificate storages 166, which may be implemented as read-only, non-volatile memory. The certificate storage 166 may store one or more root certificates of one or more Certification Authorities (CA), which, in turn, may be used for trusted timekeeper 110 certificate validation.

The secure zone 150 may be physically secured, such that it is tamper-resistant. The secure zone 150 may also (alternatively, or in addition to being tamper-resistant) incorporate one or more tamper detection techniques. For example, several tamper-resistant methods for protecting cryptographic processors are already known and have been described in the art; see http://www.cl.cam.ac.uk/techreports/UCAM-CL-TR-641.pdf. In some embodiments, it may be desirable, for instance, to manufacture the secure zone 150 within a single chip. In another embodiment, the secure zone 150 might have a secure enclosure. In some of these embodiments, the secure zone 150 may be configured to execute one or more possible responses if it detects that the chip's integrity has been compromised, and/or if it detects penetration of the secure enclosure. These responses may vary from erasing sensitive data to the physical destruction of all or part of the secure zone 150.

Figure 6A:
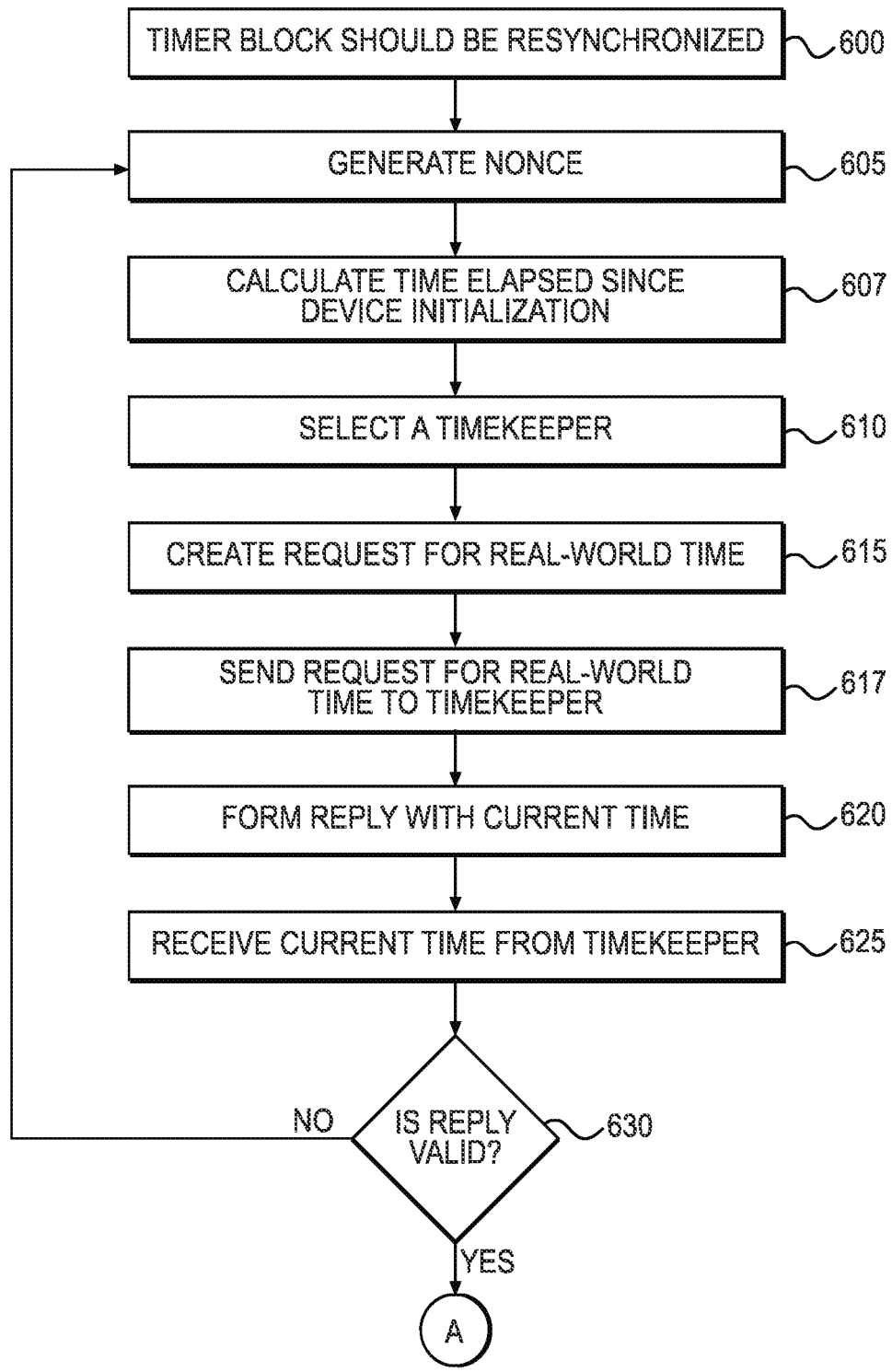
FIGS. 6a-6c are a flow diagram of an exemplary method of synchronizing a timer block according to the present disclosure.
Figure 6B:
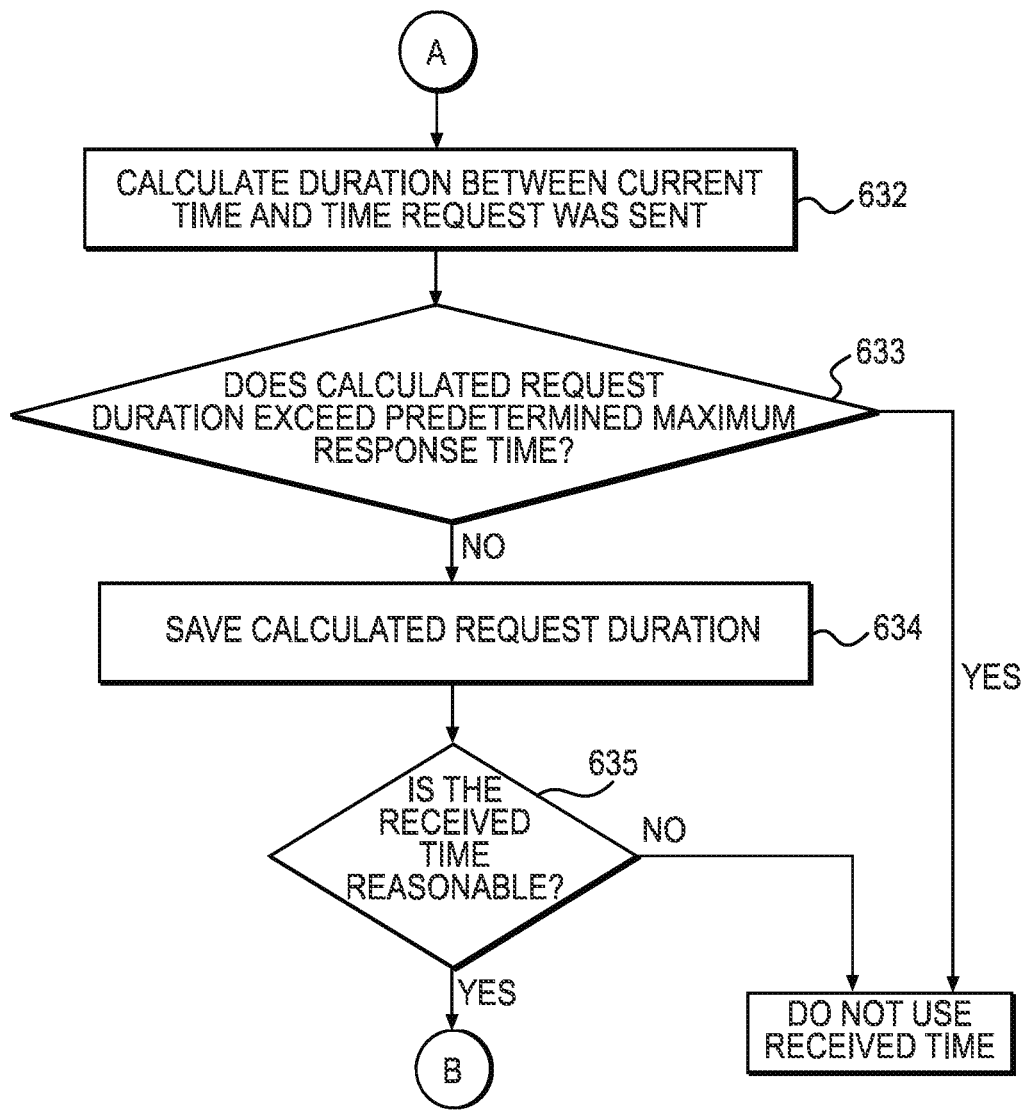
Figure 6C:
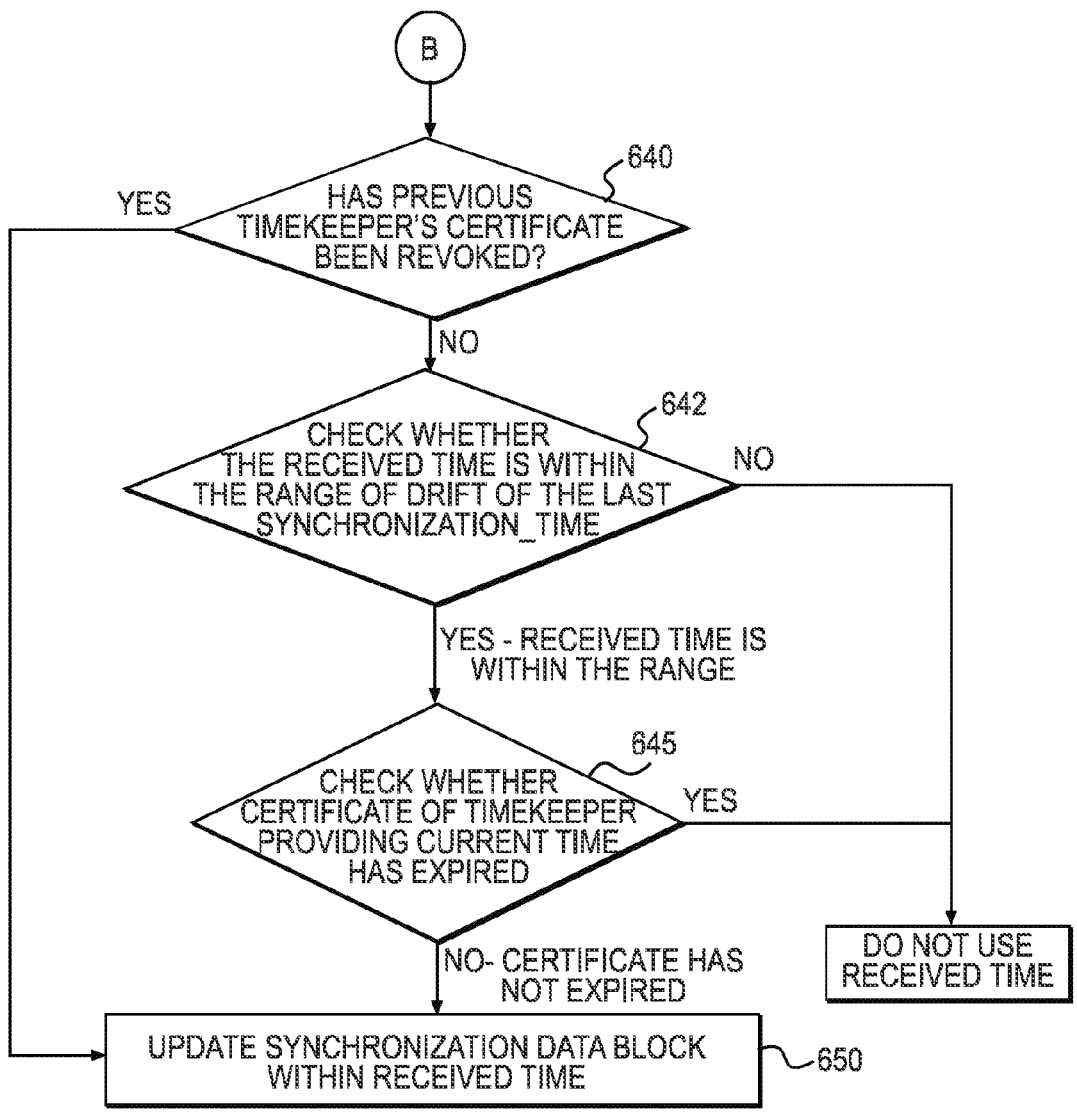

In certain embodiments, the secure zone 150 should treat as reliable only time data received from a certified, secure timekeeper 100 which was received using one or more secure data transmission algorithms. FIGS. 6a-6c illustrate one exemplary method by which the timer block 140 may be synchronized using time data received from a trusted timekeeper 110.

As shown on FIG. 6a, at step 600, it may be determined that the timer block 140 should be resynchronized. This may happen for any number of reasons including, but not limited to: (i) the timer drift accumulated since the last synchronization event exceeds a predefined, maximal allowable amount of drift (i.e., the time that will be produced by the timer block 140 will be too unreliable/erroneous for the application), which may depend, for example, on the operation which needs to be performed by the supervisor 160; (ii) the supervisor 160 has received a request from code running in the secure zone 150 for a current time, and the request has further specified that the error associated with that time should be less than a predetermined amount; or (iii) a similar request has been received from outside the secure zone 150, e.g., from an application 112 (directly or by means of operating system 111 system calls) running in the non-secure zone 152. In addition, in some embodiments, the secure zone 150 may be configured to periodically determine whether it needs to be resynchronized.

To begin the process of resynchronization, the supervisor 160 may begin preparing a request for a current time for transmission to a trusted timekeeper 110.

At step 605, the supervisor 160 may generate a nonce, i.e., a cryptographically-safe random number, to be forwarded to a trusted timekeeper 110. In certain embodiments, the supervisor 160 may use RNG 124 to generate the nonce. This nonce may be saved, e.g., within memory 146. Use of the nonce, as described further herein, may be used, for example, to ensure that a time received from a timekeeper 110 corresponds to the most recent time request generated by the supervisor 160, which may be used to prevent 'replay attacks.'

At step 607, the supervisor 160 may instruct the timer block 140 to calculate the total amount of time elapsed since the device 120 was initialized; this time may be saved, e.g., within memory 146.

In some embodiments, at step 610, the supervisor may select a particular timekeeper 110 from which a secure time will be sought from a list of available trusted timekeepers. Such a list may reference timekeepers by, for example, their absolute domain names (e.g., "example-time-keeper.com"). This list may be provided to the secure zone 150 in conjunction with a task currently running within the supervisor 160 (for example, within a predefined field of the task's associated digital certificate), or may come from and may be supported and updated within the non-secure zone 152 such as, for example, by the operating system 111 or an application 112 running within the operating system 111.

At step 615, the supervisor 160 may form the request for a current time. This request may comprise the nonce, and may optionally comprise a reference to the timekeeper 110 selected at step 610.

At step 617, a request for a current time (e.g., as formed at step 615) may be sent to the selected trusted timekeeper 110 using, for example, the non-secure zone 152 and/or the operating system 111.

At step 620, the selected timekeeper 110 may receive the request and may form a reply containing: (i) a present, real-world time value; (ii) a trusted timekeeper 110 certificate revocation list (CRL), which may include certificates of any timekeepers whose certificates have been revoked, and which may be signed, for example, by the same certificate authority which signs timekeeper certificates; and (iii) the nonce received within the request. The timekeeper 110 may sign the reply with its private key (which corresponds to the public key contained in its digital certificate) before sending the reply back to the computing device 120.

At step 625, the computing device 120 may receive the reply from the selected trusted timekeeper 110, and may forward it to the secure zone 150 for handling by the supervisor 160.

At step 630: (i) the supervisor 160 may receive the reply; (ii) verify, using the cryptographic engine 121, that the certificate was validly signed by a trusted timekeeper 110; and (iii) verify that the value of the nonce received with the reply is the same as the value provided in the request. It will be understood that a standard PKI certificate validity check may include time checks. For example, it may be desirable to determine that a certificate has not yet expired. In some embodiments, however, at this step 630, it may be preferable not to execute these standard time checks.

If, at step 630, it is determined that for some reason the reply is not valid (e.g., the nonce is different than the value of the nonce stored in memory 146, the timekeeper certificate has been revoked, etc.), this may indicate that the selected timekeeper 110 has been compromised, or there were communication errors (e.g., a dropped packet), and the received time should not be used. In certain embodiments, the supervisor 160 may repeat its attempts to obtain a trusted time by repeating steps 605-620, but may choose to contact a different timekeeper 110.

In certain embodiments, it may be desirable to calculate the amount of time it took to receive a reply from the trusted timekeeper 110. Thus, at step 632 (shown on FIG. 6b), the supervisor 160 may request that the timer block 140 calculate the difference between (i) the current amount of time elapsed since device 120 initialization, and (ii) the amount of time passed since device 120 initialization until the time when the request was made (e.g., the amount of time saved at step 607). If, at step 633, this time interval is greater than some predefined value (for instance, 30 seconds), the reply could be discarded. In most cases, this duration should be on the order of seconds or even less. Not limiting this duration appropriately may increase the possibility of certain kinds of attacks.

If, however, it is determined at step 633 that the duration between the time request and timekeeper response does not exceed the predefined value, then, at step 634, the supervisor 160 may temporarily store this duration (e.g. in memory 146). If, ultimately, the reply time is accepted for resynchronization, this duration may be saved permanently as response_time 235 within the synchronization event data block 200.

Figure 10:
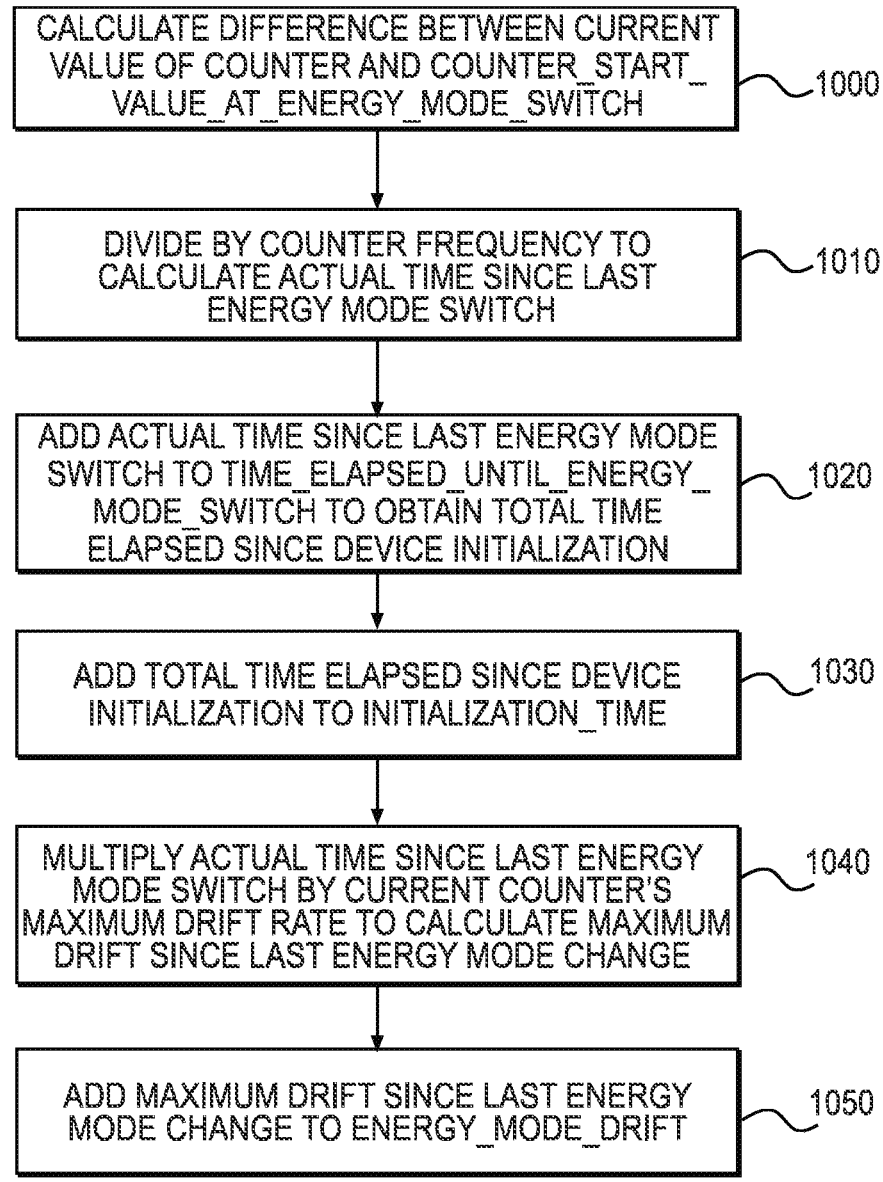
FIG. 10 is a flow diagram of an exemplary method for calculating the current time in an embodiment having two counters.

At step 635, the supervisor 160 may compare the time received from the trusted timekeeper 110 (e.g., at step 620) against the timing information generated by the timer block 140 itself, i.e., against the current time as calculated based on the time elapsed since device 120 initialization, e.g., in accordance with the methods described with respect to FIGS. 8 and 10, above.

If the time received from the trusted timekeeper 110 falls outside the range of the current time, as calculated based on the amount of time elapsed since the device 120 was initialized, plus or minus the maximum amount of drift accumulated since the device 120 was initialized, the time may be considered invalid. For example, the current time may be calculated as Jan. 1, 2012, and the maximum amount of possible drift time since device 120 initialization may be calculated as two days. If the time provided by the timekeeper 110 is before Dec. 30, 2011 or after Jan. 3, 2012, the timekeeper's time may be considered invalid. In such an event, no resynchronization should occur, and the old synchronization_time 232 should continue to be used in time calculations.

If, however, at step 635 the received time does fall within the anticipated time range then, as shown in FIG. 6c, at step 640, the supervisor 160 expressly may verify whether the timekeeper used during the previous resynchronization (i.e., the "old" timekeeper) is listed in the CRL received within the reply. If the old timekeeper is found in the CRL list, it may be assumed that the old timekeeper was compromised and that the previous synchronization_time 232 is unreliable. In this case, the newly received time value—which has been checked against the time elapsed since the device was initialized (e.g., at step 635)—should be used to resynchronize the timer block 140, e.g., in accordance with step 650, below.

If, at step 640, the old timekeeper's certificate has not been revoked, and the old synchronization_time 232 is considered trustworthy, then at step 642, the supervisor 160 may verify that the time received from the new timekeeper 110 falls somewhere within the range of the current time calculated based on the last successful synchronization, synchronization_time 232, plus or minus the maximum possible amount of drift since the last synchronization. If the two time values are found to be in conflict—e.g., the time received from the new timekeeper 110 is outside of this range—the conflict between trusted timekeepers may be resolved in favor of the old timekeeper 110 used during the last successful synchronization, no resynchronization should occur, and the old synchronization_time 232 should continue to be used.

If, however, the received time is within the range at step 642, then at step 645, it may be determined whether the digital certificate provided by the trusted timekeeper 110 during the current resynchronization request has expired. This may be determined, for example, by comparing the certificate's expiration time with the current time kept by the timer block 140 based on the last successful resynchronization. (To account for the fact that the timer may experience drift, it may be preferable to first subtract the maximum amount of drift which could have accumulated from the time of the last successful resynchronization from the current time.) If the certificate has not expired, the newly received time value may be used to resynchronize the timer block 140, e.g., in accordance with step 650, below. Otherwise, the old resynchronization remains in effect; no resynchronization should occur, and the old synchronization_time 232 should continue to be used. In the latter case, in some embodiments, the supervisor 160 may report this conflict to any or all parties with which it may be connected, as this may lead to the external resolution of conflict between timekeepers. For example, a system operator may check the conflict report to determine if there was a compromise of any of timekeeper keys; in such a case, the certificate associated with any compromised timekeeper keys could be invalidated, and, subsequently, the supervisor 160 may receive this update in a CRL.

It should be noted that in some other embodiments, other methods, for instance, based on a majority of timekeepers reporting consistent data, may be used solely or in combination with some steps of the above method.

In certain situations, if a synchronization has not occurred within a certain time frame, the maximum amount of drift accumulated from the time the timer block 140 was last successfully synchronized may exceed a permissible value. This permissible value might be set, for example, by the supervisor 160, or by code running within or outside the secure zone 150. When this happens—i.e., when the drift is too great—in certain embodiments, the supervisor 160 may repeat its attempts to synchronize by repeating steps 600-645.

At step 650, the values of the synchronization block 230 may be updated to reflect the new time. For example: The timekeeper_ID 231 may be updated with the identifier for the timekeeper reporting the new time. The synchronization_time 232 may be updated with the current time received from the timekeeper 110 (e.g., at step 620). In some embodiments, the time_elapsed_until_synchronization 233 may be updated to store the total amount of time elapsed since device 120 initialization until the time of this most recent synchronization. In other embodiments, to simplify certain subsequent calculations (described in greater detail below), it may be preferable instead to store within time_elapsed_until_synchronization 233 the time elapsed since the device 120 was initialized until the middle of the interval between a secure time request and the timekeeper's reply. The maximum possible drift since the device 120 was initialized until the time of this most recent synchronization may be stored into synchronization_drift 234. Finally, the duration of time it took to receive a response from the timekeeper 110 (e.g., as calculated at step 632 and temporarily stored at step 634) may be stored into response_time 235.

Figure 6D:
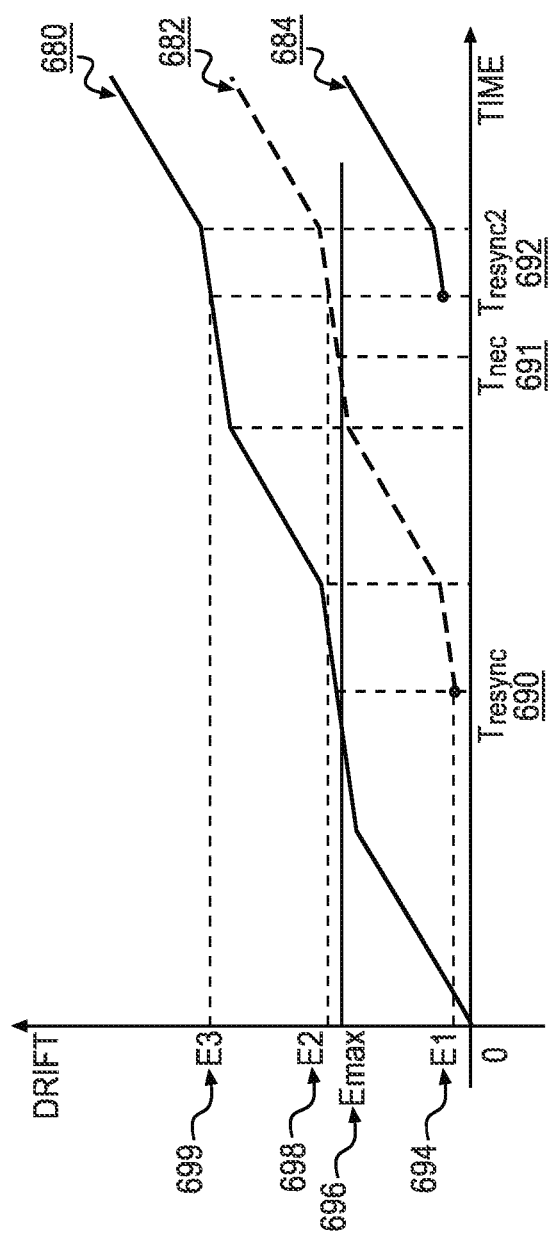
FIG. 6d is a graph showing how the error associated with a current time calculation may be reduced as a result of one or more synchronization events.

FIG. 6*d* is a graph showing how the error associated with a current time computation may be reduced due to one or more resynchronizations.

Curve 680 represents the maximum drift that could have accumulated since the computing device 120 was initialized. If computations of the current time are based on the time set during initialization (e.g., as calculated in accordance with the method shown on FIG. 8), this drift curve 680 will provide an upper boundary on the possible error.

Curve 682 represents the maximum error associated with a current time which was calculated based on a previous synchronization event occurring at time $T_{resync}$ 690. The shape of this curve is the same as that of the part of the curve 680 to the right of $T_{resync}$ 690, as if that part were shifted down.

It will be noted that even at the time of synchronization (e.g., $T_{resync}$ 690), the initial value of any error associated with the current time calculation may not necessarily be zero. For example, as shown on FIG. 6*d*, at the time of the first synchronization $T_{resync}$ 690, the initial error may be some value E1 (shown on FIG. 6*d* as value 694), which may depend on the duration of time between sending a secure time request and receiving a response from a trusted timekeeper 110 (which may be stored as response_time 235). After some period of time, the maximum amount of drift accumulated since device 120 initialization will become greater than E1 694.

It will be understood that, depending on the context in which the inventions described herein are used, it may be desirable to limit the maximum amount of error acceptable within the system. For example, this may be implemented as a policy of the supervisor 160. Level $E_{max}$ 696, as shown on FIG. 6*d*, represents this maximum permissible error. As time progresses, this error may be exceeded, shown on FIG. 6*d* as time $T_{nec}$ 691. As a result, at $T_{nec}$ 691, the system may determine that it is necessary to resynchronize the timer block 140.

It may be, however, though, that the resynchronization happens later, at some time $T_{resync2}$ 692, such that $T_{resync2}$ 692>$T_{nec}$ 691. This delay may occur, for example, because during the period between $T_{nec}$ and $T_{resync2}$ the device 120 was turned off, and no operations (except, perhaps, time monitoring in low-energy power mode, which in itself may result in greater imprecision), can be performed. Regardless of the cause of the delay, if the accumulated error at time $T_{resync2}$ 692 since the previous resynchronization (shown on FIG. 6*d* as E2 698) exceeds value $E_{max}$ 696, any time or interval calculated based on the last synchronization time ($T_{resync}$ 690) may not be reported and the system may determine that it is necessary to resynchronize the timer block 140. Following this resynchronization, the error in the system will be represented by a new curve, shown as curve 684 on FIG. 6*d*, which is below the original error curve 682.

Figure 7:
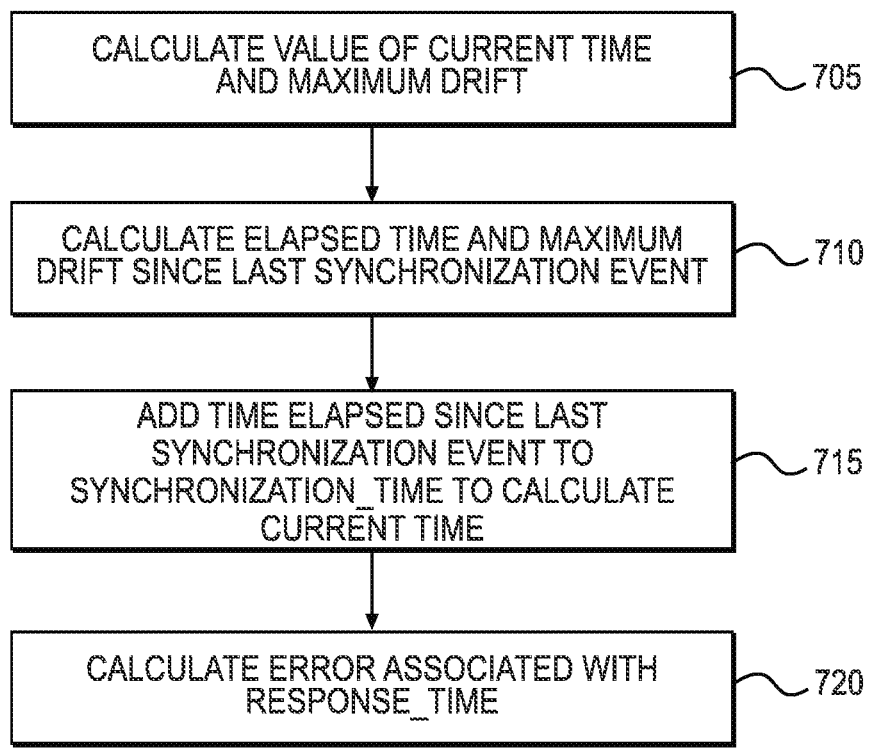
FIG. 7 shows one exemplary method by which the time it takes to receive a response from a timekeeper on a request for a current time may be factored into an error calculation.

FIG. 7 shows one exemplary method by which a secure time may be calculated using information received during the most recent synchronization with a trusted timekeeper 110.

At step 705 a task may request the supervisor to provide the current time and the maximum error associated with that estimation. (This may be calculated, e.g., as described with respect to FIG. 8.)

At step 710, the time elapsed and the maximum drift accumulated since the last synchronization event may be calculated as described in greater details above.

At step 715, the time elapsed since the last synchronization event may be added to synchronization_time 232 to calculate the current time.

At step 720, the error associated with the time derived from the most recent synchronization_time 232 may be computed. It will be understood that error is a function of both the maximum drift associated with a timer, which increases over time, as well as any delay in receiving a response from a timekeeper; therefore, both components should be taken into account. As used throughout, the concept of drift has been represented as a quantity which is either subtracted from or added to the calculated time; in other words, the actual time falls within a range of the calculated time+/−the maximum drift. As a result, to reduce the complexity of error calculations, it similarly may be preferable to use a value of time_elapsed_until_synchronization 233 selected to be exactly in the middle of the interval between sending the request to the timekeeper and receiving its reply. In such embodiments, one-half of the response_time 235 may be added to the drift accumulated since the last synchronization event to calculate the total error associated with the current time.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus for secure time management, comprising:
   a non-volatile storage to store a synchronization time;
   a first counter configured to increment at a first predetermined frequency;
   a second counter configured to increment at a second predetermined frequency, wherein the first predetermined frequency and the second predetermined frequency are different; and
   a processor configured to:
      generate a request for a current time, the request to include a nonce generated at the apparatus;
      transmit the request to a trusted timekeeper;
      receive a response containing a current, real-world time from the trusted timekeeper, the response being digitally signed with a digital signature;
      verify the digital signature of the response;
      verify that the response is received within a predefined time;
      compare the nonce in the request to a nonce in the response;
      determine that the current, real-world time received from the trusted timekeeper is within a range of a first current time calculated at the apparatus based on the synchronization time, numbers counted by the first and the second counters respectively, and switching event information; and
      update the synchronization time with the current, real-world time in the response received from the trusted timekeeper, when the current, real-world time is within the range of the first current time.

2. The apparatus of claim 1, wherein the processor is further configured to determine that a previous timekeeper used for a last successful synchronization is listed in a certificate revocation list (CRL) in the received response.

3. The apparatus of claim 1, wherein the processor is further configured to determine that the current, real-world time received from the trusted timekeeper is within a range of a second current time calculated at the apparatus based on an amount of time elapsed since the apparatus was initialized.

4. The apparatus of claim 2, wherein the trusted timekeeper is selected from a list of available trusted timekeepers.

5. The apparatus of claim 4, wherein the list of available trusted timekeepers are provided with a task running in the apparatus.

6. The apparatus of claim 1, wherein the processor is further configured to provide a point in time or an amount of time elapsed between two events when requested.

7. The apparatus of claim 1, further comprising a battery, wherein the first counter is configured to be powered by the battery when the apparatus is powered off.

8. The apparatus of claim 1, wherein the non-volatile storage stores a first maximum drift rate associated with the first counter for the first predetermined frequency and a second maximum drift rate associated with the second counter for the second predetermined frequency.

9. The apparatus of claim 8, further comprising a battery, wherein the first predetermined frequency is lower than the second predetermined frequency, and the first counter is configured to be powered by the battery when the apparatus is powered off.

10. The apparatus of claim 8, wherein the processor is further configured to:
   store the switching event information about switching between the first and the second counters, and
   provide a time reference and a maximum drift of the time reference using numbers counted by the first and the second counters respectively according to the stored information for which of the first and second counters having been switched on, the synchronization time, and the first and second maximum drifts.

11. A computer-implemented method for secure time management, comprising:
   generating, at an apparatus, a request for a current time, the request to include a nonce generated at the apparatus;
   transmitting the request to a trusted timekeeper;
   receiving a response containing a current, real-world time from the trusted timekeeper, the response being digitally signed with a digital signature;
   verifying the digital signature of the response;
   verifying that the response is received within a predefined time;
   comparing the nonce in the request to a nonce in the response;
   determining that the current, real-world time received from the trusted timekeeper is within a range of a first current time calculated at the apparatus based on a synchronization time stored in a non-volatile storage of the apparatus, a number counted by a first counter incremented at a first predetermined frequency, a number counted by a second counter incremented at a second predetermined frequency, and switching event information, wherein the first predetermined frequency and the second predetermined frequency are different; and
   updating the synchronization time with the current, real-world time in the response received from the trusted timekeeper when the current, real-world time is within the range of the first current time.

12. The computer-implemented method of claim 11, further comprising determining that a previous timekeeper used for a last successful synchronization is listed in a certificate revocation list (CRL) in the received response.

13. The computer-implemented method of claim 11, further comprising determining that the current, real-world time received from the trusted timekeeper is within a range of a second current time calculated at the apparatus based on an amount of time elapsed since the apparatus was initialized.

14. The computer-implemented method of claim 12, further comprising selecting the trusted timekeeper from a list of available trusted timekeepers.

15. The computer-implemented method of claim 14, further comprising receiving the list of available trusted timekeepers with a task running in the apparatus.

16. The computer-implemented method of claim 11, further comprising providing a point in time or an amount of time elapsed between two events when requested.

17. The computer-implemented method of claim 11, further comprising powering the first counter using a battery when the apparatus is powered off.

18. The computer-implemented method of claim 12, further comprising:
storing a first maximum drift rate associated with the first counter for the first predetermined frequency and a second maximum drift rate associated with the second counter for the second predetermined frequency.

19. The computer-implemented method of claim 18, further comprising powering the first counter to increment at the first predetermined frequency when the apparatus is powered off, wherein the first predetermined frequency is lower than the second predetermined frequency.

20. The computer-implemented method of claim 18, further comprising:
storing switching event information about switching between the first and the second counters, and
providing a time reference and a maximum drift of the time reference using numbers counted by the first and the second counters respectively according to the stored information for which of the first and second counters having been switched on, the synchronization time, and the first and second maximum drifts.

21. A non-transitory computer readable medium containing program instructions for a method for secure time management, the instructions causing a computer to execute the method, comprising:
generating, at an apparatus, a request for a current time, the request to include a nonce generated at the apparatus;
transmitting the request to a trusted timekeeper;
receiving a response containing a current, real-world time from the trusted timekeeper, the response being digitally signed with a digital signature;
verifying the digital signature of the response;
verifying that the response is received within a predefined time;
comparing the nonce in the request to a nonce in the response;
determining that the current, real-world time received from the trusted timekeeper is within a range of a first current time calculated at the apparatus based on a synchronization time stored in a non-volatile storage of the apparatus, a number counted by a first counter incremented at a first predetermined frequency, a number counted by a second counter incremented at a second predetermined frequency, and switching event information, wherein the first predetermined frequency and the second predetermined frequency are different; and
updating the synchronization time with the current, real-world time in the response received from the trusted timekeeper when the current, real-world time is within the range of the first current time.

22. The non-transitory computer readable medium of claim 21, wherein the method further comprises determining that a previous timekeeper used for a last successful synchronization is listed in a certificate revocation list (CRL) in the received response.

23. The non-transitory computer readable medium of claim 21, wherein the method further comprises determining that the current, real-world time received from the trusted timekeeper is within a range of a second current time calculated at the apparatus based on an amount of time elapsed since the apparatus was initialized.

* * * * *